United States Patent
Segers

(10) Patent No.: US 8,683,760 B2
(45) Date of Patent: Apr. 1, 2014

(54) FIXING SYSTEM FOR SOLAR PANELS

(75) Inventor: Johan Segers, Heus-Zolder (BE)

(73) Assignee: Segers BVBA, Heusden-Zolder (BE)

( * ) Notice: Subject to any disclaimer, the term of this patent is extended or adjusted under 35 U.S.C. 154(b) by 34 days.

(21) Appl. No.: 13/376,357

(22) PCT Filed: May 31, 2010

(86) PCT No.: PCT/IB2010/052424
§ 371 (c)(1),
(2), (4) Date: Apr. 20, 2012

(87) PCT Pub. No.: WO2010/140110
PCT Pub. Date: Dec. 9, 2010

(65) Prior Publication Data
US 2012/0204500 A1  Aug. 16, 2012

(30) Foreign Application Priority Data

Jun. 5, 2009 (BE) .................................. 2009/0343

(51) Int. Cl.
*E04D 13/18* (2006.01)
*E04H 9/02* (2006.01)
*F16M 11/04* (2006.01)
*B41J 29/08* (2006.01)

(52) U.S. Cl.
CPC .. *E04H 9/02* (2013.01); *B41J 29/08* (2013.01)
USPC .......................... 52/173.3; 52/167.8; 248/669

(58) Field of Classification Search
USPC ............ 52/27, 118, 167.6, 167.8, 173.3, 478, 52/713, 764, 765; 248/656, 669
See application file for complete search history.

(56) References Cited

U.S. PATENT DOCUMENTS

| | | | |
|---|---|---|---|
| 4,426,813 A | 1/1984 | Buzzi, Jr. | |
| 2008/0016794 A1* | 1/2008 | Tremblay et al. | 52/167.4 |

FOREIGN PATENT DOCUMENTS

| | | |
|---|---|---|
| CH | 474645 | 4/1968 |
| DE | 3022037 A1 | 12/1981 |
| DE | G 88 14 815.7 U1 | 2/1989 |
| DE | 20312330 U1 | 9/2004 |
| DE | 102005010509 A1 | 9/2006 |
| DE | 20 2006 014 048 U1 | 12/2006 |
| DE | 102007053556 A1 | 5/2009 |
| EP | 1619727 A2 | 1/2006 |
| WO | 2004074596 A1 | 9/2004 |

OTHER PUBLICATIONS

International Search Report PCT/IB2010/052424; Sep. 19, 2011.

* cited by examiner

*Primary Examiner* — William Gilbert
(74) *Attorney, Agent, or Firm* — Sughrue Mion, PLLC

(57) ABSTRACT

Fixing system for solar panels for use on principally flat roofs, consisting of a base and a roof penetration, which base can be anchored to the existing steel structure of the roof, which base is further suitable to be connected to the specified roof penetration, which roof penetration is equipped above with fixings for the attachment of the further structure of the solar panels, where the roof penetration includes an inner tube and an outer tube formed from principally rectangular tubes fitting one inside the other without contacting one another, at an angle of 45° so that rubber profiles can be pressed into the spaces between the inner tube and the outer tube, serving to provide thermal gaps and functioning as a mechanical connection between the inner tube and the outer tube.

6 Claims, 1 Drawing Sheet

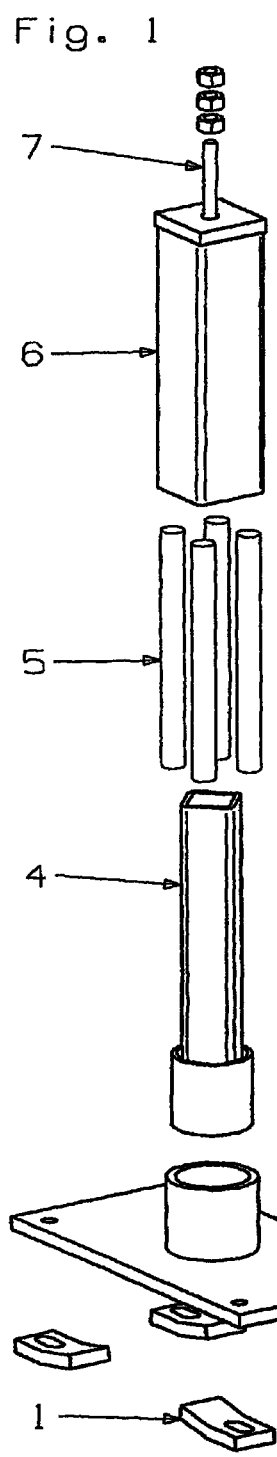
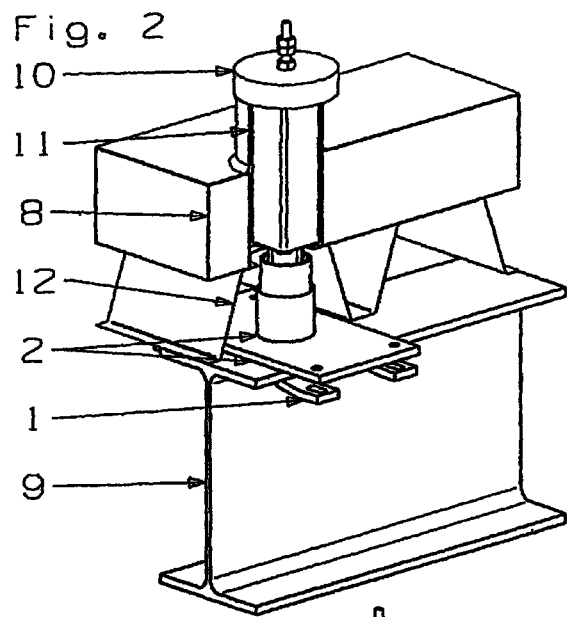
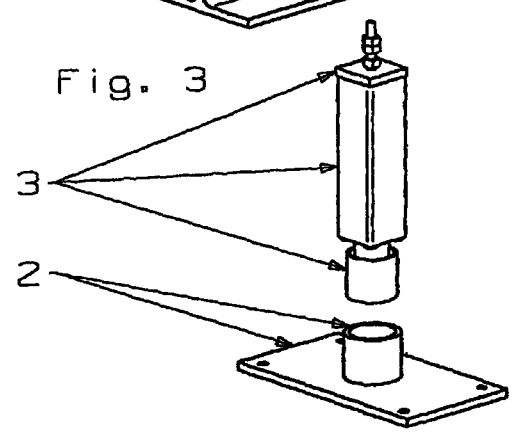
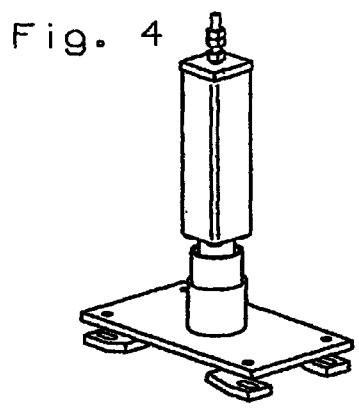

FIXING SYSTEM FOR SOLAR PANELS

The invention relates to a fixing system for solar panels for use on principally flat roofs, consisting of a base (2) and a roof penetration (3), which base can be anchored to the existing steel structure (9) of the roof, which base is further suitable to be connected to the named roof penetration (3), which roof penetration (3) is equipped above with fixings (7) for the attachment of the further structure of the solar panels.

The fixing system is already known and forms part of the technical state of the art. This fixing system offers the advantage that the construction with the solar panels can be anchored directly to the steel structure of the building. No additional ballast is therefore required to mount the construction with the solar panels on a flat roof in such a way that it is safe in the event of storms.

Such a fixing system does however have the disadvantage that a cold bridge exists at each location where the construction with the solar panels is anchored to the steel structure.

The objective of the invention is to provide a fixing system for solar panels with a thermal gap.

For this purpose the fixing system for solar panels according to the invention is characterised by a formed inner tube (4) and outer tube (6) which fit one within the other without contacting one another, so that intervening spaces are created between the inner and the outer tube, whereby rubber profiles (5) are pressed into the intervening spaces which function as thermal gaps and as a mechanical connection between the inner and the outer tube. This makes it possible to anchor the solar panels to the steel structure of the building without creating cold bridges.

For preference the specified inner tube (4) and outer tube (6) are to be formed from principally rectangular tubes placed at an angle of 45° to one another. A simple technical method is hereby provided to allow the inner tube and outer tube to fit one within the other without contacting one another, thereby creating intermediate spaces.

The base is preferably provided with a threaded socket whereby the roof penetration is provided with a screw thread below to fit the socket. A straightforward technical method is thereby provided to attach the roof penetration to the base.

The invention will now be described in greater detail on the basis of the example implementation represented in the drawing.

In the drawing:

FIG. 1 shows the fixing system in an exploded view;

FIG. 2 shows the fixing system as it is used in reality in the roof construction;

FIG. 3 shows the fixing system, in subassemblies; and

FIG. 4 shows the fixing system fully assembled.

A similar or analogous element is given the same reference number in the drawing.

The fixing system consists of a base 2 which can be anchored to the existing steel structure 9 of the building, for example using clamping plates 1.

This base 2 is provided with a socket with a screw thread. This screw thread is provided in order to connect the base to the roof penetration 3, which is provided with a reciprocal screw thread for this purpose. This connection can also be created in other ways in accordance with the invention.

The roof penetration 3 consists of an inner tube 4 and an outer tube 6. This inner tube 4 and outer tube 6 are reciprocally formed such that the inner tube can be placed within the outer tube 6, whereby on the one hand there is no mechanical contact between the inner tube 4 and the outer tube 6, and on the other hand intermediate spaces are created, being preferably at least three cavities, principally triangular in cross section, into which an insulating profile can be pressed. "Triangular" should not be interpreted in a limitative sense such that three straight sides and three sharp angles are required. The angles of the triangle may be rounded and the sides may be deflected in form without affecting the essence of the invention.

The inner tube 4 is preferably provided with a screw thread to fit the socket in the base 2. The outer tube 6 is provided at the top with fixings 7 to which the further construction of the solar panels can be secured. Inner tube 4 and outer tube 6 are both preferably rectangular tubes and their dimensions are so selected that inner tube 4 will fit into outer tube 6, and in such a way that no contact occurs between both tubes when they are turned at an angle of 45° to one another. The four intermediate spaces, principally triangular in cross section, which are so created between the two tubes, are now used for the insertion of four rubber profiles 5. These rubber profiles 5 thereby serve as a thermal gap between the two tubes 4 and 6 and also provide for a robust mechanical attachment between the two tubes 4 and 6.

Since the roof penetration 3 can be fixed, preferably by screwing into the base 2, it is possible to screw the roof penetration 3 into the base 2 after the base 2 has been secured to the steel structure of the building. The opening which must then be provided in the roof need then only be just large enough for the roof penetration 3, and not for the entire construction.

The longitudinal dimensions of tubes 4 and 6 are so selected that the "cold" outer tube 6 does not protrude below the insulation 8 of the roof. The inner tube is hereby equipped to be connected to the base and the outer tube is equipped to be connected to the solar panels. Since the outer tube 6 is of such a length that it does not protrude below the roof insulation 8, there is no heat transfer from the exterior to the interior.

The base 2 may be fitted to the steel structure 9 in the free spaces in the roof profile sheets 12 as shown in FIG. 2.

A watertight finish is further provided by incorporating an upstanding edge 11 in the roof covering, and closing off this upstanding edge 11 with a lid 10.

The invention claimed is:

1. A fixing system suitable for solar panels onto substantially flat roofs, comprising a base and a roof penetrator, which base is anchorable to an existing steel structure of the roof, which base is further provided to be connected to said roof penetrator, which roof penetrator is provided at the top with fixing means suitable for the fixation of a further structure of the solar panels, wherein the roof penetrator comprises an inner tube and an outer tube, which are formed and which fit the one within the other without contacting each other in such a manner that intermediate spaces are formed between the inner tube and the outer tube, said inner tube and said outer tube being formed by substantially rectangular tubes which area placed at an angle of 45° one with respect to the other, and rubber profiles being pressed into the intermediate spaces which function as thermal break and as mechanical connection between the inner tube and the outer tube, and wherein the fixing system provides a thermal break between the further structure and the existing steel structure of the roof.

2. The fixing system suitable for solar panels according to claim 1, wherein the base is provided with a socket with screw thread and wherein the roof penetrator is provided at the bottom with screw thread fitting in the socket.

3. The fixing system suitable for solar panels according to claim 1, which fixing system is anchored onto a substantially flat roof and fixes a solar panel onto said substantially flat roof.

4. The fixing system suitable for solar panels according to claim 1, which fixing system is anchored onto a substantially flat roof and fixes any one or more from the group of an airco unit, a heat pump, a heat exchange unit, a cooling unit, a ventilation unit, an HVAC unit, a wind turbine, a duct, a tube, a life line, a billboard, a platform, a water container, an antenna and a satellite dish onto said substantially flat roof.

5. A roof penetrator, suitable for a fixing system for solar panels onto substantially flat roofs, which roof penetrator is provided at the top with fixing means for the fixation of a further structure of the solar panels, wherein the roof penetrator comprises an inner tube and an outer tube, which are formed and which fit the one within the other without contacting each other in such a manner that intermediate spaces are formed between the inner tube and the outer tube, said inner tube and said outer tube being formed by substantially rectangular tubes which are placed at an angle of 45° one with respect to the other, and rubber profiles being pressed into the intermediate spaces which function as thermal break and as mechanical connection between the inner tube and the outer tube.

6. The roof penetrator according to claim 5, wherein the roof penetrator is provided at the bottom with screw thread, suitable to fit in a socket of a base which is anchorable to an existing steel structure of the roof.

* * * * *